United States Patent Office 3,213,054
Patented Oct. 19, 1965

3,213,054
RESINOUS COMPOSITIONS PLASTICIZED WITH POLY(ESTER-LACTONES)
Erhard J. Prill, Des Peres, and James C. Wygant, Creve Coeur, Mo., assignors to Monsanto Company, a corporation of Delaware
No Drawing. Original application Jan. 4, 1960, Ser. No. 23, now Patent No. 3,155,686, dated Nov. 3, 1964. Divided and this application Feb. 21, 1963, Ser. No. 260,332
8 Claims. (Cl. 260—30.4)

Our parent copending application, Serial No. 23, filed January 4, 1960, now U.S. Patent No. 3,155,686, from which this is a divisional application, discloses a process for reacting alkenylsuccinic anhydrides with polyhydric alcohols or polyols to form poly(ester lactones), a process for esterifying alkenylsuccinic anhydrides to form poly-(acid-esters) of said alkenylsuccinic anhydrides and a polyhydric alcohol, a process for lactonization of the poly(acid-esters) of alkenylsuccinic anhydrides and polyhydric alcohols to form poly(ester lactones) and poly-(acid-esters) of alkenylsuccinic anhydrides and polyhydric alcohols as new products.

This invention relates to polyvinyl halide resin compositions containing a plasticizing amount of a poly(ester lactone) and methods for producing the same.

The preparation of mono-ester lactones from alkenyl-succinic anhydrides and mono-hydric alcohols is disclosed and claimed in our copending application, Serial No. 34, filed January 4, 1960, now U.S. Patent No. 3,155,685. Since the mono-ester lactones are useful as plasticizers, it is desirable to provide some related compounds which are better suited for some particular applications.

An object of this invention is to provide methods for plasticizing polyvinyl halide resins by incorporating therewith a plasticizing amount of a poly(ester lactone).

Another object of this invention is to provide polyvinyl halide resin compositions containing a plasticizing amount of poly(ester lactone).

Other objects and advantages of this invention will be apparent to one skilled in the art upon studying the accompanying disclosure and claims.

In accordance with the parent application, 2-alkenylsuccinic anhydrides are reacted with a polyhydric alcohol or polyol to form a poly(ester lactone). The reactants are initially reacted in the absence of a catalyst and then an acid-type catalyst is employed to complete the reaction. The initial phase of the reaction involves the simultaneous opening of the cyclic rings of the 2-alkenylsuccinic anhydrides and esterification of the several hydroxyl groups of a polyhydric alcohol to form the poly(acid-ester) of the polyhydric alcohol as illustrated by Equation 1:

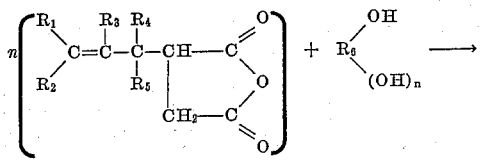

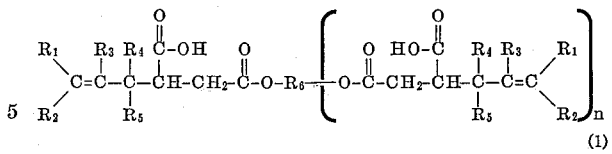

(1)

This esterification reaction results primarily in the formation of the poly(acid-ester) shown; however, more than one poly(acid-ester) product is sometimes formed in the reaction depending upon where the opening of the cyclic chain is effected. For example, the poly(acid-ester) may either have the configuration

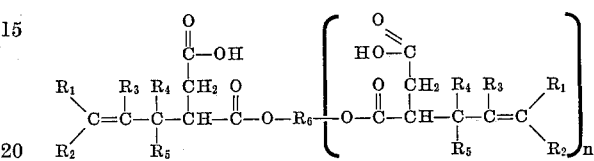

or be a combination of the two poly(acid-ester) types shown.

The final phase of the reaction requires the use of a catalyst and involves intramolecular cyclization of the poly(acid-ester) to form a poly(ester lactone), as illustrated by Equation 2:

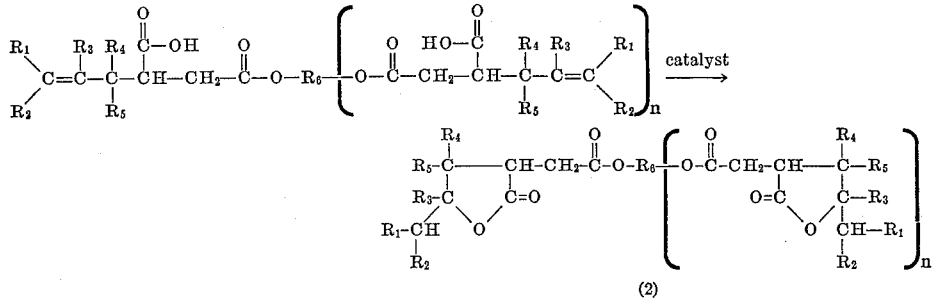

(2)

The use of the catalyst in the initial phase of the reaction tends to result in the formation of poly diesters instead of the poly mono- or acid-esters and the formation of the polydiesters prevents the intramolecular cyclization in the final phase of the reaction to form the lactone. Although the poly(ester lactone) product usually possesses the configuration of a γ-valerolactone as shown in Equation 2, other poly(ester lactone) products are sometimes also formed having the configuration of a δ-valerolactone of the formula:

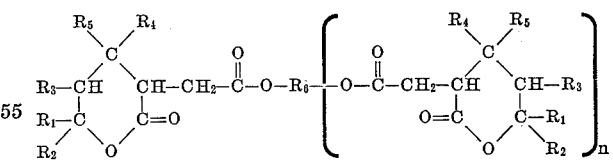

and the configuration of a δ-methyl-δ-valerolactone of the formula

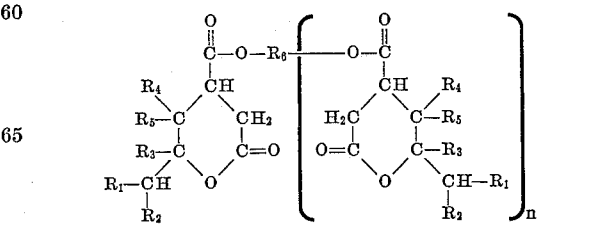

Further, in accordance with the present application, there are provided as new compounds, poly(ester lactones) of the formulas

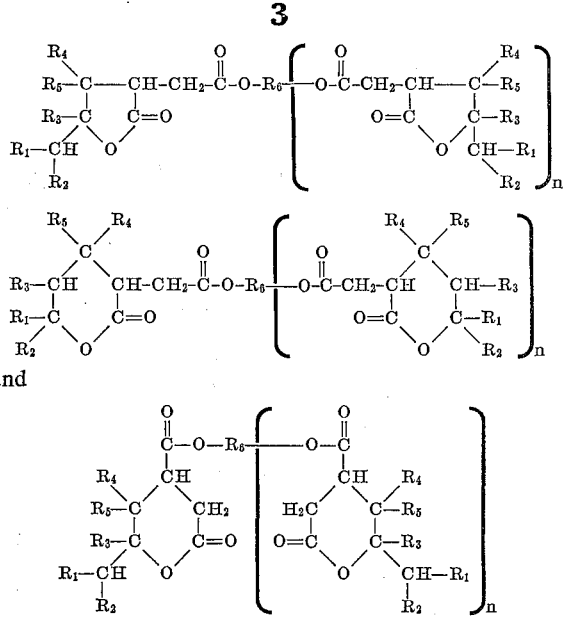

and

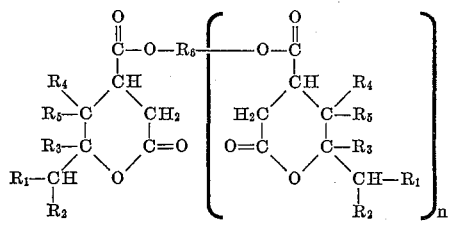

wherein $R_1$, $R_2$, $R_3$, $R_4$ and $R_5$ are selected from the group consisting of hydrogen, hydrocarbyl, hydrocarbyloxy, halohydrocarbyl, halohydrocarbyloxy, hydrocarbyloxyalkyl, carboalkoxy, acyl, carboalkoxyalkyl, cyano, cyanohydrocarbyl, carboxy, carboxyalkyl, and acyloxy radicals of less than 32 carbon atoms and free of non-benzenoid unsaturation, each of said $R_1$, $R_2$, $R_3$, $R_4$ and $R_5$ being the same or different, and $R_6$ is the radical obtained by removing $n$ H-atoms from the carbon atoms of a compound selected from the group consisting of an alkane of 2 to 18 carbon atoms, cycloalkane of 5 to 18 carbon atoms, alkoxyalkane of 4 to 18 carbon atoms, alkene of 4 to 18 carbon atoms, alkyne of 4 to 18 carbon atoms, and phenylenedialkane of 2 to 18 carbon atoms in the alkane group, and $n$ is a whole number of from 1 to 5.

In accordance with this invention, there is provided a method for plasticizing polyvinyl halide resins by incorporating with said resins a plasticizing amount of a poly(ester lactone) of the formula:

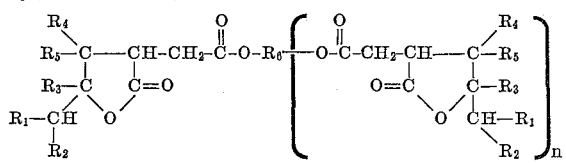

wherein $R_1$, $R_2$, $R_3$, $R_4$, $R_5$, $R_6$, and $n$ are as above defined.

Further, in accordance with this invention, there are provided improved polyvinyl halide resin compositions comprising polyvinyl halide resins and a plasticizing amount of a poly(ester lactone) of the formula

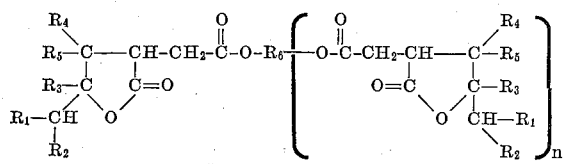

wherein $R_1$, $R_2$, $R_3$, $R_4$, $R_5$, $R_6$ and $n$ are as above defined.

The 2-alkenylsuccinic anhydride reactants suitable for use in the parent application can have either a straight-chain or a branched-chain alkenyl group but the double bond of the alkenyl group must be located in the 2-position. For example, the alkenyl group can be a 2-propenyl, 2-methylallyl, 2-butenyl, 2-pentenyl, or the like. Succinic anhydrides substituted with a branched-chain alkenyl group, including alkenyl groups which are substituted with other groups besides those containing only carbon and hydrogen, are also very suitable reactants. Thus, the $R_1$, $R_2$, $R_3$, $R_4$, and $R_5$ radicals can be either hydrogen; hydrocarbyl radicals, including alkyl radicals such as methyl, ethyl, hexyl, decyl, undecyl, pentadecyl, tricosyl, hexacosyl, dotricontyl, isobutyl, 5-methylhexyl, and 2-methyldecyl; aryl radicals such as phenyl; alkaryl radicals such as methylphenyl, diethylphenyl, isopropylphenyl and tert-amylphenyl; aralkyl radicals such as benzyl, amylbenzyl, phenylethyl, and phenylpropyl; hydrocarbyloxy radicals, including alkoxy radicals such as methoxy, ethoxy, butoxy, isopentyloxy, n-dodecyloxy, n-octyloxy and ethylhexyloxy, alkylaroxy radicals such as octylphenoxy, dodecylphenoxy, methylphenoxy, and diethylphenoxy, aroxy radicals such as phenoxy; arylalkoxy radicals such as benzyloxy, methylbenzyloxy, phenylethoxy, phenylbutoxy and methylphenylethoxy; halohydrocarbyl radicals where the halogen is either chlorine, bromine, iodine or fluorine, including haloalkyl radicals such as 2-chloroethyl, 3,3-dibromobutyl, 3-iodo-5-ethylhexyl, and 2,3-difluorooctyl, haloaryl radicals such as 2-chlorophenyl, 2,4-dibromophenyl, 4-iodophenyl, 2,4-difluorophenyl, haloalkaryl radicals such as 2-chloro-4-methylphenyl, 2,4-dibromo-3-ethylphenyl, 2-iodo-4-methylphenyl, and 2-fluoro-4-propylphenyl, haloaralkyl radicals such as chlorobenzyl and bromobenzyl; halohydrocarbyloxy radicals including haloalkoxy radicals such as chloromethoxy, bromobutoxy, iodoethoxy, and fluoromethoxy, haloalkylaroxy radicals such as chlorooctylphenoxy and bromooctylphenoxy, haloaroxy radicals such as chlorophenoxy, bromophenoxy, iodophenoxy, and fluorophenoxy, and haloarylalkoxy radicals such as chlorobenzyloxy and bromobenzyloxy; hydrocarbyloxyalkyl radicals including alkoxyalkyl radicals such as 2-methoxyethyl, 3-ethoxy-n-propyl, 4-butoxybutyl, and 2,3-di-n-octyloxypropyl, aroxyalkyl radicals such as phenoxymethyl and phenoxyethyl, alkylaroxyalkyl radicals such as methylphenoxyethyl and octylphenoxymethyl radicals, and arylalkoxyalkyl radicals such as benzyloxymethyl, phenylethoxymethyl and methylphenylbutoxyethyl; carboalkoxy radicals such as carbomethoxy and carboethoxy; acyl radicals such as formyl, acetyl, propionoyl, heptanoyl, decanoyl, benzoyl and phenylacetyl; carboalkoxyalkyl radicals such as carboethoxyethyl, carbo-n-propyloxybutyl, carbobutoxypropyl, carbomethoxyamyl and carbohexoxyethyl; cyano radicals; cyanohydrocarbyl radicals including cyanoalkyl radicals such as cyanomethyl and cyanopropyl and cyanoaryl radicals such as cyanophenyl and dicyanophenyl; carboxy radicals; carboxyalkyl radicals such as carboxyethyl, carboxybutyl, carboxyoctyl, carboxydecyl, and 3-carboxybutyl; and acyloxy radicals such as formyloxy, acetyloxy, propionyloxy, benzoyloxy, heptanoyloxy and decanoyloxy.

The invention of the parent application is not limited by the number of carbon atoms in each of the $R_1$, $R_2$, $R_3$, $R_4$ and $R_5$ radicals and radicals containing any number of carbon atoms can be used; however, preferably, radicals having fewer than 32 carbon atoms are employed. Also, other hydrocarbyl radicals can also be employed in the process provided the hydrocarbyl radicals are free of non-benzenoid unsaturation; that is, olefinic and acetylenic unsaturation.

The 2-alkenylsuccinic anhydride reactants wherein the alkenyl group is a branched-chain structure are preferably produced by the addition of an olefin or a lower olefin dimer, trimer, tetramer or pentamer to maleic anhydride as is well known to those skilled in the art. These lower olefins, such as propylene, butylene, and isobutylene, form polymers which result from polymerization of the olefin with sulfuric acid or metallic halides or which result from the simultaneous dehydration and polymerization of the tertiary alcohols by concentrated sulfuric acid. Thus, tetrapropenylsuccinic anhydride is formed by the addition of propylene tetramer to maleic anhydride and, in a similar manner, diisobutenylsuccinic anhydride is formed from isobutylene dimer and maleic anhydride.

The polyhydric alcohol or polyol reactants suitable for use in the parent application are the alkanes, including branched-chain alkanes, alkenes, cycloalkanes, alkoxyalkanes, alkynes, and the phenylenedialkanes substituted with at least 2 hydroxyl groups and not more than 6 hydroxyl groups on carbon atoms other than the α-carbon atoms adjacent the oxygen atom of the alkoxyalkanes, the olefinic carbon atoms of the alkenes, and the acetylenic carbon atoms of the alkynes. Preferably, the alkanes have from 2 to 18 carbon atoms and include ethane, isobutane, hexane, octane, 2-methyl-1,3-pentane, dodecane, hexadecane, and the like. Preferably, the cycloalkanes have from 5 to 18 carbon atoms and include as examples, cyclopentane, cyclohexane, 1,3-dimethylcyclohexane, and the like. Preferably, the alkoxyalkanes have from 4 to 18 carbon atoms and include ethoxyethane, ethoxyhexane, octoxyoctane, butoxy-2-methyl-decane and the like. Preferably, the alkenes have from 4 to 18 carbon atoms and include 2-butene, 3-decylene, 4-dodecylene, 2-octadecylene, and the like. Preferably, the alkynes have from 4 to 18 carbon atoms per molecule and include 2-butyne, 2-octyne, 3-dodecyne, 4-octadecyne, and the like. Preferably, the phenylenedialkanes have from 2 to 18 carbon atoms in the non-aromatic portions of the molecule and include p-phenylenedimethane, m-phenylenedihexane, o-phenylenedioctane, and the like.

Illustrative examples of some suitable polyhydric alcohol reactants for use in the parent application include 1,2-ethanediol, 1,2 - propanediol, 1,3 - propanediol, 1,4 - butanediol, 2,5-hexanediol, 1,6-dodecanediol, 2-methyl-1,3-pentanediol, 2-methyl-2,4-pentanediol, 2,3-dimethyl- 2,3-butanediol, 2 - ethyl - 2-butyl-1,3-propanediol, 1,2,3-propanetriol, 1,2,3-butanetriol, 3,4,5-octanetriol, 1,2,3,4-butanetetraol, pentaerythritol, 1,2,3,4 - decanetetraol, 2,2'-oxydiethanol, 4,4'-oxydibutanol, 3,3'-oxydihexanol, 2,2'-ethylenedioxydiethanol, 2 - butene-1,4-diol, 2-hexene-1,6-diol, 4 - octene - 1,2,6 - triol, 5-decene-1,2,7,8-tetraol, 2-butyne - 1,4 - diol, 4-octene-1,2,6-triol, dipentaerythritol, ribitol, xylitol, arabitol, dulcitol, sorbitol, mannitol, iditol, talitol, allitol, inositol, and syllitol.

The esterification and intramolecular cyclization reactions are usually carried out at a temperature below about 150° C. because the use of more elevated temperatures results in the formation of a substantial amount of the diester instead of the partial ester of the succinic anhydride. The reaction can be conducted at temperatures as low as approximately room temperature, e.g., 20° C., particularly when using low molecular weight alkenylsuccinic anhydrides and polyhydric alcohols; however, it is usually desirable to use a temperature above room temperature in order to have relatively short reaction times. Ordinarily, these reactions are carried out at substantially atmospheric pressure although pressures above atmospheric may be employed with the more volatile reactants.

Usually, stoichiometric amounts of the alkenylsuccinic anhydride and polyhydric alcohol reactants are maintained in the partial esterification reaction zone; that is, one mole of alkenylsuccinic anhydride for each hydroxyl group of the polyhydric alcohol. It is also possible to use an excess of the alkenylsuccinic anhydride although the use of an excess of this rectant is usually not desirable since the unreacted alkenylsuccinic anhydride must be recovered in the purification step.

The partial esterification step of the process should be conducted in a catalyst-free system since the use of a catalyst tends to promote the formation of the diester instead of the mono- or acid-ester. The formation of the diester product is undesirable since the diester cannot be intramolecularly cyclized to form the desired lactone.

The intramolecular cyclization step is involved in the process of this invention must be carried out in the presence of an acid-type catalyst in order to effect formation of the poly(ester lactone). Suitable catalysts include the mineral acids such as hydrochloric acid, sulfuric acid, perchloric acid, and phosphoric acid; the sulfonic acids such as the alkanesulfonic acids and the arylsulfonic acids such as formic and propionic acids; and sulfonic boron trifluoride, antimony trichloride, and titanium tetrachloride; the lower molecular weight aliphatic carboxylic acids such of formic and propionic acids; and sulfonic type ion exchange resin materials, such as cross-linked sulfonated polystyrene which is commercially available as Dowex-50. The alkanesulfonic acid catalysts are preferably the lower alkanesulfonic acids containing from 1 to 12 carbon atoms, for example, methane-sulfonic acid, ethanesulfonic acid, propanesulfonic acid and butanesulfonic acid. If desired, a mixture of lower alkanesulfonic acids can be used and such a mixture containing methane-, ethane-, and propanesulfonic acids is commercially available. Ordinarily, the alkanesulfonic acid will comprise from 92 to 95% sulfonic acid, from 1 to 2% sulfuric acid, and from 3 to 6% water. The arylsulfonic acid catalysts which can be used in this step include the benzenesulfonic acid, toluenesulfonic acid, and chlorobenzenesulfonic acid, with p-toluenesulfonic acid and 4-chloro-benzenesulfonic acid being preferred. The amount of catalyst present in the reaction zone can be varied over wide limits depending upon the nature of the reactants and the catalyst used. The amount of catalyst used is also determined to a considerable extent by the temperatures selected for conducting the reaction. Thus, at higher temperatures the amount of catalyst required in the reaction zone is smaller than when lower temperatures are used and the use of excessive amounts of catalyst at more elevated temperatures will promote the formation of undesirable side-products. Ordinarily, the amount of catalyst used will be between about 0.1% up to 5% by weight of the amount of the alkenylsuccinic anhydride present.

The partial esterification and the intramolecular cyclization steps involved in the reaction can be carried out either batchwise or in a continuous manner. If the reactions are carried out batchwise, the partial esterification step is conducted first and after the completion of this step, the catalyst is added to the system in order to effect the intramolecular cyclization. Ordinarily, the partial esterification step will be completed in a period of time of less than approximately ½ hour; however, substantially longer periods of time may be required in some cases with particular reactants. The partial esterification step can be conducted over long periods of time if a suitable low temperature is used and a reaction time as long as 17 hours has been employed without substantial formation of the diester product. After completion of the partial esterification step, the catalyst can be added directly to the reaction zone without effecting any changes in the reaction conditions. If desired, the reaction mixture obtained in the esterification step can be subjected to a separation step to effect removal of any unreacted reactants. Although the catalyst tends to promote the formation of the diester product when the succinic anhydride and the polyhydric alcohol reactants are brought together in the presence of the catalyst, there is generally no substantial formation of the diester product in the intramolecular cyclization step even though there is an excess of the polyhydric alcohol reactant present in the reaction zone because the intramolecular cyclization step occurs more readily than the partial esterification step under these conditions.

If the process is carried out in a continuous manner the catalyst is added to the system at a point after substantial completion of the partial esterification step so as not to be present in the system at a place where the esterification of the alkenylsuccinic anhydride and the polyhydric alcohol reactants takes place.

After completion of the intramolecular cyclization step, the reaction mixture is washed first with water to remove the acid catalyst and then with a dilute alkaline solution to remove any remaining catalyst, unreacted acid ester, and/or anhydride. Suitable dilute alkaline materials useful for this purpose include aqueous sodium hydroxide, aqueous sodium carbonate, and aqueous calcium hydroxide solutions. After washing, the recovered material is purified in the usual manner by distillation, solvent extraction, or selective adsorption procedures.

The poly(ester lactone) products are stable compounds which vary in nature from viscous liquids to crystalline solids and which range in color from colorless to a yellow color. The boiling points of the liquid compounds are very high, usually being above about 200° C. These poly(ester lactones) have good solvent properties and are soluble in benzene, alcohols, ethers, ketones and the like; however, they are generally insoluble in water.

The poly(ester lactones) of this invention are advantageously used for a variety of industrial purposes as well as intermediates in the formation of other chemical compounds. The liquid poly(ester lactones) are characterized by having low volatility and good viscosity characteristics, thereby finding use as functional fluids in hydraulic fluid systems as well as vacuum pump systems. The solid poly(ester lactones) of this invention find use as a solid plasticizer in dry cements comprising the poly(ester lactone) and a non-plasticized resin or latex polymer. These cement compositions are non-adhesive until heat activated and find particular use for attaching labels to cloth materials and metal products. Both the liquid and the solid poly(ester lactones) of this invention find use as plasticizers for various synthetic resins, particularly the polyvinyl halide resins such as polyvinyl chloride, to form softened compositions of increased resiliency and flexibility.

As plasticizers, the poly(ester lactones) of this invention are fully compatible with vinyl halide resins as is apparent by visual inspection of the plasticized composition. These poly(ester lactones) produce flexible polyvinyl halide compositions at room temperature and these plasticized polyvinyl halide compositions do not become brittle and useless with age or upon heating because these poly(ester lactones) have very low volatility and are relatively insoluble in water.

The advantages, desirability and usefulness of the present process in the reaction of alkenylsuccinic anhydrides with polyhydric alcohols to form poly(ester lactones), and use in polyvinyl halide compositions, are well illustrated by the following examples.

*Example 1*

In this example, 133 g. (0.5 mole) of tetrapropenylsuccinic anhydride was reacted with 15.5 g. (0.25 mole) of 1,2-ethanediol. The reactants were heated in a reaction flask for a period of 2.75 hours at a temperature in the range of 105 to 115° C. At the end of this time, the reaction mixture was cooled slightly and 2 ml. of concentrated sulfuric acid added to the reaction mixture which was then heated for a period of 16 hours at a temperature in the range of 105 to 110° C. The thick, dark brown colored reaction mixture was then cooled and transferred to a separatory funnel and diluted with 100 ml. of benzene. After removal of the benzene-layer, the material was shaken with 100 ml. of water; 100 ml. of diethyl ether was also added to aid in layer separation. Upon separation of the phases, the water layer was removed and the oil layer was washed first with 100 ml. and then with 50 ml. of a 5% sodium hydroxide solution, followed by washing with 100 ml. of water. The washed product was then heated with 100 ml. of water at a temperature in the range of 100 to 110° C. for a period of from 2 to 3 hours to distill off the ether-benzene solvent and to hydrolyze any tetrapropenylsuccinic anhydride. The residue from this operation was then taken up in 100 ml. of diethyl ether and washed successively with 100 ml. of 5% sodium hydroxide solution and two 100 ml. portions of water. Activated charcoal was then placed in a small flask containing the product and the product was aspirated at a pressure of 20 mm. while heating on the steam bath for a period of about 4 hours. At the end of this time, the product was filtered to separate out the activated charcoal and obtain 73 g. of the bis(ester-lactone) which is a light straw-colored liquid. Calculated for $C_{34}H_{58}O_8$: C, 68.65%; H, 9.83%. Found: C, 68.23%; H, 9.69%.

*Example 2*

In this example, 100 g. (0.378 mole) of tetrapropenylsuccinic anhydride was reacted with 16.9 g. (0.188 mole) of 1,4-butanediol which had a boiling point of 122.5 to 126° C./10 mm. The reactants were heated in a reaction flask for a period of 1.5 hours at a temperature of about 120° C. At the end of this time, 2.0 ml. of concentrated sulfuric acid was added to the reaction mixture which was then heated for a period of 16.5 hours at a temperature of approximately 108° C. The dark colored reaction mixture obtained was then cooled, diluted with 100 ml. of diethyl ether, and washed successively with 100 ml. of water, 100 ml. of 5% sodium hydroxide solution, 50 ml. of 5% sodium hydroxide solution, and 100 ml. of water. The washed product was then heated for approximately 1 hour with the addition of 50 ml. of water to hydrolyze any unreacted tetrapropenylsuccinic anhydride and to permit the diethyl ether to be volatilized. The product was then made basic with sodium hydroxide and the oil layer separated from the water layer in a separatory funnel. The oil recovered was dried by heating to a temperature of 100° C. in a vacuum in the presence of activated charcoal. After filtering the product to remove the charcoal, there was obtained 51 g. of the bis(ester-lactone) product which is a clear, but very dark-colored, viscous liquid. Calculated for $C_{36}H_{62}O_8$: C, 69.42%; H, 10.03%. Found: C, 69.42%; H, 10.08%.

*Example 3*

In this example, 100 g. (0.378 mole) of tetrapropenylsuccinic anhydride was reacted with 20.0 g. (0.188 mole) of 2,2'-oxydiethanol which had a boiling point of 128 to 130° C./10 mm. The reactants were heated in a reaction flask for a period of 1.5 hours at a temperature of 120° C. Thereafter, 2.0 ml. of concentrated sulfuric acid was added to the reaction mixture which was then heated for a period of 16.5 hours at the same temperature. The dark colored reaction mixture was then diluted with 100 ml. of diethyl ether and washed successively with 100 ml. of water, 100 ml. of 5% sodium hydroxide solution and 100 ml. of water. The washed product was then heated for 1 hour with 50 ml. of water to hydrolyze unreacted tetrapropenylsuccinic anhydride and to volatilize the diethyl ether. The product was then made basic by the addition of sodium hydroxide and the oil layer separated from the water layer in a separatory funnel. The product was then contacted with activated charcoal which was removed by filtration. The small amount of diethyl ether remaining was removed by heating at a temperature of 100° C. and a reduced pressure which also effected drying of the product. The bis(ester-lactone) amounted to 70 g. and was a clear, but very dark-colored, viscous liquid. Calculated for $C_{36}H_{62}O_9$: C, 67.68%; H, 9.78%. Found: C, 67.52%; H, 9.52%.

*Example 4*

In this example, 120 g. (0.78 mole) of β-methylallylsuccinic anhydride was reacted with 35 g. (0.39 mole) of 1,4-butanediol. The reactants were heated in the reaction flask for a period of 4.5 hours at a temperature of about 120° C. Thereafter, 2 ml. of concentrated sulfuric acid was added to the reaction mixture, causing the temperature of the mixture to rise to 160° C. The reaction mixture was then cooled to a temperature of 120° C. and maintained at this temperature for a period of 4 hours. The viscous, dark brown product obtained was diluted with 200 ml. of water and the slurry formed filtered to separate out the solid product. The solid product was then washed with 200 ml. of 5% sodium hydroxide solution and 200 ml. of water. The product was then recrystallized from a mixture of water and alcohol to obtain 97.3 g. of a light tan-colored solid material having a melting point of 100 to 107° C. Calculated for $C_{20}H_{30}O_8$: C, 60.29%; H, 7.59%. Found: C, 60.15%; H, 7.78%.

*Example 5*

In this example, 120 g. (0.78 mole) of β-methylallylsuccinic anhydride was reacted with 42 g. (0.39 mole) of 2,2′-oxydiethanol. The reactants were heated in a reaction flask at a temperature of approximately 120° C. for a period of 4.5 hours. Thereafter, 2 ml. of concentrated sulfuric acid was added to the reaction mixture causing the temperature to rise to 144° C. The reaction mixture was then cooled to a temperature of 120° C. and maintained at this temperature for a period of 4 hours. The viscous, dark brown liquid product obtained was diluted with 100 ml. of benzene and 50 ml. of diethyl ether. This mixture was then washed successively with water, 5% sodium hydroxide solution and water. The washed product was then heated for a period of approximately 1 hour with 50 ml. of water to hydrolyze the unconverted methylallylsuccinic anhydride and to volatilize the solvent. After making the product basic with sodium hydroxide solution, the oil layer was separated from the water layer, decolorized with activated charcoal and heated at a temperature of 100° C. under vacuum to remove any remaining solvent and dry the product. The product was then distilled to obtain 80.2 g. of the bis(ester-lactone) boiling at 241 to 278° C./0.14–0.95. The product was a yellow-colored viscous liquid having a refractive index $n_D^{25}$ 1.4727. Calculated for $C_{20}H_{30}O_9$: C, 57.96%; H, 7.30%. Found: C, 57.90%; H, 7.14%.

*Example 6*

In this example 6.8 g. (0.05 mole) of pentaerythritol was reacted with 38 g. (0.25 mole) of methylallylsuccinic anhydride. The reactants were heated in a reaction flask at a temperature of 120° C. for a period of approximately 1.5 hours. Thereafter, the mixture was cooled to a temperature of 80 to 90° C. and 0.5 ml. of 70% perchloric acid added causing the temperature of the reaction mixture to rise to over 120° C. The reaction mixture was cooled to a temperature of approximately 100° C. to 120° C. and maintained at a temperature within this range for approximately 45 minutes. The black colored reaction mixture was then dissolved in 100 ml. of acetone and diluted with 400 ml. of water. Upon the formation of two phases, the aqueous phase was separated and washed with 100 ml. of benzene. The benzene solution formed was then combined with the oil phase obtained from the addition of the 400 ml. of water and washed with 100 ml. of 5% sodium hydroxide followed by washing with two 100 ml. portions of water. The benzene phase was then evaporated on a steam bath to obtain a dark brown-colored oil. This oil was then vacuum dried at a temperature of 100° C. under pressure of 20 mm. to remove the solvents. The hot residue was then filtered in a sintered glass filter to obtain a dark product which solidified into a glass form. This material was the tetra(ester lactone). Calculated for $C_{37}H_{52}O_6$: C, 59.0%; H, 7.0%. Found: C, 59.33%; H, 6.92%.

*Example 7*

In this example, 50 g. of methylallysuccinic anhydride was reacted with 13 g. (0.15 mole) of butynediol. The reactants were heated in a reaction flask at a temperature of approximately 100° C. for 2 hours. At the end of this time, the reaction mixture was cooled and 0.5 g. of p-toluenesulfonic acid added. The reaction mixture was then heated for approximately 1.5 hours at a temperature up to 120° C. During this heating step, the drop in acidity of the reaction mixture was periodically determined by titrating 0.5-ml. portions of the reaction mixture with 0.1095 N sodium hydroxide. Upon completion of the reaction, the viscous, dark brown colored reaction mixture was dissolved in 100 ml. of ether and washed successively with 100 ml. of water, 100 ml. of 5% sodium hydroxide solution, 40 ml. of 5% sodium hydroxide solution, and 50 ml. of water. The combined aqueous phases were then washed with 50 ml. of ether. The combined ether solutions were evaporated on a steam bath to obtain the bis(ester lactone) as a viscous oil. The bis(ester lactone) was dried at a temperature of 80° C. under a pressure of 20 mm. Calculated for $C_{20}H_{26}O_8$: C, 60.9%; H, 6.6%. Found: C, 60.74%; H, 6.66%.

*Example 8*

In this example, the plasticizer properties of several of the poly(ester lactones) of this invention were determined for use in polyvinyl chloride resins. These resin compositions comprise 60 parts of the polyvinyl chloride resin and 40 parts of the candidate plasticizer, including ¼ phr. of dibasic lead stearate as a heat stabilizer. These materials were mixed on a rolling mill to form a homogeneous blend and visual inspection of the compositions indicated that all of the candidate plasticizers were compatible with polyvinyl chloride. Molded sheets from all of the milled mixtures were clear and transparent. The volatility, water extraction and kerosene extraction for these compositions in the form of a molded sheet were determined and are reported in the table below:

| Compound | Volatility, percent Lost | Water Ext., percent Soluble Matter Lost | Kerosene Extraction, percent Plast. Lost |
|---|---|---|---|
| Bis(ester lactone) from tetrapropenylsuccinic anhydride and 1,2-ethanediol | 0.6 | 0.11 | 0.47 |
| Bis(ester lactone) from tetrapropenylsuccinic anhydride and 1,4-butanediol | 0.6 | 0.07 | 0.48 |
| Bis(ester lactone) from tetrapropenylsuccinic anhydride and 2,2′-oxydiethanol | 0.8 | 0.20 | 0.65 |
| Bis(ester lactone) from methylallylsuccinic anhydride and 2,2′-oxydiethanol | 3.7 |  | 0.82 |

In these tests, the volatility was determined according to the Carbon Absorption Method of the Society of the Plastics Industry. The amount of water extraction and kerosene extraction was determined by immersion of a sample in distilled water and kerosene for a period of 24 hours, followed by a determination of the loss in weight of the sample.

While the above example shows only compositions in which the ratio of plasticizer, i.e., the poly(ester lactone), to polyvinyl chloride is 40:60, this ratio being employed in order to get comparable efficiencies, the ratio of poly(ester lactone) to polyvinyl chloride may be varied over a wide range, depending upon the properties desired in the vinyl resin product. For some purposes, a plasticizer content of say from 2 to 5% would be desirable; however, usually a plasticizer content above 10% is used. The present poly(ester lactone) products are compatible with polyvinyl chloride over wide ranges in concentrations up to 50% of the poly(ester lactone) product based on the total weight of the plasticized composition.

The invention has been described particularly with reference to the use of the present poly(ester lactone) products as plasticizers for polyvinyl chloride resins, but these poly(ester lactones) are also advantageously employed as plasticizers for copolymers of polyvinyl chloride, for example, vinyl chloride-vinyl acetate copolymers, vinyl chloride-acrylonitrile copolymers, vinyl chloride-vinylidene chloride copolymers, vinyl chloride-vinylidene chloride-acrylonitrile copolymers and the like. Preferably, such copolymers have a vinyl chloride content of at least 70% by weight and up to 30% by weight of the copolymerizable monomer.

The plasticized polyvinyl halide compositions of the present invention have good thermal stability; however, it may be desirable for various purposes to include known stabilizers in the plasticized compositions. Inasmuch as the present poly(ester lactone) products are substantially unreactive with the commercially available heat and light stabilizers which are commonly employed with polyvinyl halide resins, the presence of such materials in the plasticized compositions does not impair the valuable properties of the poly(ester lactone) products.

The poly(ester lactones) of this invention, either singly or in combination, are incorporated with the polyvinyl halide resin to form a plasticized polyvinyl halide resin by either milling or by dissolving therein the plasticizer in a neutral solvent and allowing the solvent to evaporate, or by any other conventional technique. Colors, dyes, extenders, pigments and other compounding ingredients can be included in the plasticized polyvinyl halide composition if it is so desired.

Reasonable variations and modifications of the invention as described are possible, the essence of which is that there have been provided: (1) methods for plasticizing polyvinyl halide resins by incorporating therewith a plasticizing amount of the disclosed poly(ester lactones), and (2) plasticized polyvinyl halide compositions containing a plasticizing amount of said poly(ester lactones).

We claim:

1. A resinous composition comprising a vinyl halide polymer plasticized with from 2 to 50 weight percent, based on the total weight of the resinous composition, of a poly(ester lactone) of a 2-alkenylsuccinic anhydride and a polyhydric alcohol having less than 18 carbon atoms, wherein said poly(ester lactone) is selected from the group consisting of poly(ester gamma-lactones) and poly(ester delta-lactones) characterized by the structural formula

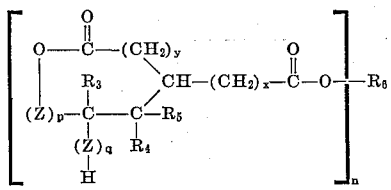

wherein $n$ is an integer from 2 to 6, $p$, $q$, $x$ and $y$ each are integers from 0 to 1, the sum of $x$ and $y$ is 1, the sum of $p$ and $q$ is 1, Z represents the divalent radical

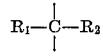

each of $R_1$, $R_2$, $R_3$, $R_4$ and $R_5$ are free from non-benzenoid unsaturation and are selected from the group consisting of hydrogen, and unsubstituted alkyl, aryl, alkaryl and aralkyl radicals, wherein said radicals have less than 32 carbon atoms therein; and $R_6$ is the non-hydroxy moiety of a polyhydric alcohol originally having up to 6 hydroxyl groups, which non-hydroxy moiety is selected from the group consisting of polyvalent alkane, cycloalkane, alkoxyalkane, phenylenedialkane, alkene, and alkyne radicals having from 2 to 18 carbon atoms and $n$ free-valent bonds.

2. The resinous composition of claim 1, wherein the vinyl halide polymer is polyvinyl chloride.

3. The resinous composition of claim 1, wherein the vinyl halide polymer is a copolymer of at least 70 weight percent of vinyl chloride and up to 30 weight percent of an unsaturated copolymer copolymerizable therewith.

4. The resinous composition of claim 2, wherein the poly(ester lactone) plasticizer is characterized by the structural formula

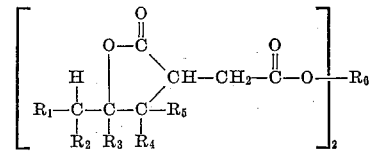

wherein $R_1$, $R_2$, $R_3$, $R_4$ and $R_5$ are —$(C_mH_{2m})_rH$ groups, wherein $m$ is an integer from 1 to 17, $r$ is an integer from 0 to 1, the sum of the carbon atoms of said groups does not exceed 17, and at least one of said groups is an alkyl radical; and $R_6$ is the non-hydroxy moiety of a saturated aliphatic dihydric alcohol having from 2 to 18 carbon atoms.

5. The resinous composition of claim 4, wherein $R_1$ is —$C_9H_{19}$; $R_2$, $R_3$, $R_4$ and $R_5$ are H; and $R_6$ is —$(CH_2)_2$—.

6. The resinous composition of claim 4, wherein $R_1$ is —$C_9H_{19}$; $R_2$, $R_3$, $R_4$ and $R_5$ are H; and $R_6$ is —$(CH_2)_4$—.

7. The resinous composition of claim 4, wherein $R_1$ is —$C_9H_{19}$; $R_2$, $R_3$, $R_4$ and $R_5$ are H; and $R_6$ is —$(CH_2)_2$—O—$(CH_2)_2$—.

8. The resinous composition of claim 4, wherein $R_3$ is —$CH_3$; $R_1$, $R_2$, $R_4$ and $R_5$ are H; and $R_6$ is —$(CH_2)_2$—O—$(CH_2)_2$—.

No references cited.

MORRIS LIEBMAN, *Primary Examiner.*

PO-1050
(5/69)

UNITED STATES PATENT OFFICE
CERTIFICATE OF CORRECTION

Patent No. 3,213,054      Dated October 19, 1965

Inventor(s) Erhard J. Prill and James C. Wygant

It is certified that error appears in the above-identified patent and that said Letters Patent are hereby corrected as shown below:

Column 2, line 69, the words "present application," should read -- parent application, --.

Column 5, line 42, the word "syllitol." should read -- scyllitol. --; column 5, line 63, the word "rectant" should read -- reactant --; column 5, line 72, that portion of the sentence reading "cyclization step is involved" should read -- cyclization step involved --.

Column 6, lines 4 through 8, that portion of the sentence reading "acids such as formic and propionic acids; and sulfonic boron trifluoride, antimony trichloride, and titanium tetrachloride; the lower molecular weight aliphatic carboxylic acids such of formic and propionic acids; and sulfonic type ion exchange resin materials, such as cross-linked" should read -- acids; the Lewis type acids such as aluminum chloride, boron trifluoride, antimony trichloride, and titanium tetrachloride; the lower molecular weight aliphatic carboxylic acids such as formic and propionic acids; and sulfonic acid type ion exchange resin materials, such as cross-linked --.

SIGNED AND
SEALED

JUL 29 1969

(SEAL)
Attest:

Edward M. Fletcher, Jr.
Attesting Officer

WILLIAM E. SCHUYLER, JR.
Commissioner of Patents